United States Patent [19]

Johnson

[11] 4,283,083

[45] Aug. 11, 1981

[54] VEHICLE-ATTACHED ARTICLE CARRIER

[76] Inventor: Raymond L. Johnson, Rte. 4 Box 268A, Texarkana, Ark. 75502

[21] Appl. No.: 154,662

[22] Filed: May 30, 1980

[51] Int. Cl.³ .............................................. B60R 11/06

[52] U.S. Cl. ................................ 296/24 R; 220/22.3; 220/334; 224/273; 224/309; 296/37.1; 296/50; 296/57 R

[58] Field of Search ......................... 220/23, 223, 334; 296/24 R, 57 R, 37.1, 37.6, 37.13, 50; 224/273, 42.03 A, 42.03 R, 42.07, 42.08, 309, 311, 328, 329

[56] References Cited

U.S. PATENT DOCUMENTS

| | | | |
|---|---|---|---|
| 1,434,350 | 10/1922 | Collins . | |
| 2,577,263 | 12/1951 | Myers . | |
| 2,722,352 | 11/1955 | Dehnel . | |
| 2,784,027 | 3/1957 | Temp . | |
| 3,231,292 | 1/1966 | Lorenz ............................ | 296/37.1 X |
| 3,393,845 | 7/1968 | Gilbreath . | |
| 3,814,473 | 6/1974 | Lorenzen, Jr. . | |
| 4,179,153 | 12/1979 | Cole, Jr. ............................. | 296/37.1 |
| 4,215,896 | 8/1980 | Drouin .............................. | 296/24 R |

FOREIGN PATENT DOCUMENTS

| | | | |
|---|---|---|---|
| 1169751 | 1/1959 | France .................................. | 296/37.1 |

*Primary Examiner*—Allan N. Shoap

*Attorney, Agent, or Firm*—Hall, Myers & Rose

[57] ABSTRACT

An article carrier that is attachable to a closure of a land vehicle is provided. The article carrier has a body and a lid that form an interior compartment when brought together. The body is attached to the inside wall of the closure. The lid is rotatably attached to the body near the end of the body that is at the bottom of the closure. The lid has flanges at the top corners thereof that extend outwardly from the lid such that the flanges are received between the closure and the sidewalls of the vehicle when the closure is shut. The article carrier can have permanent and temporary dividers therein to compartmentalize the inside of the article carrier.

13 Claims, 10 Drawing Figures

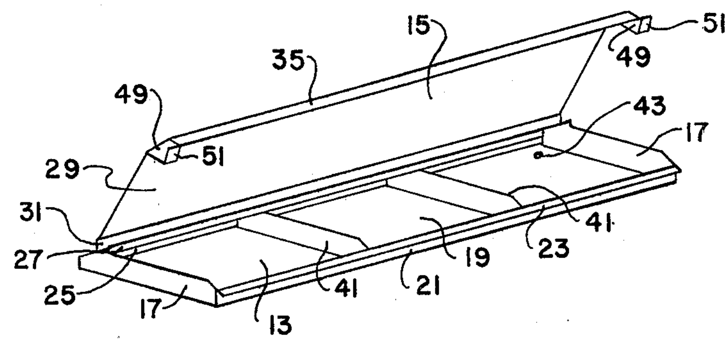
FIGURE 1
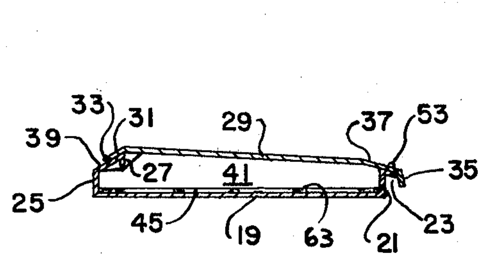
FIGURE 2
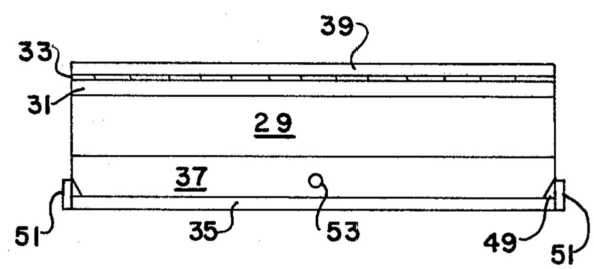
FIGURE 3
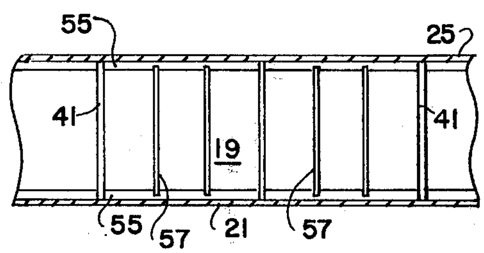
FIGURE 4
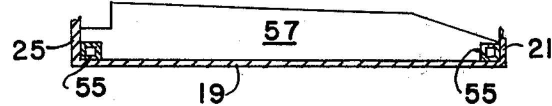
FIGURE 5
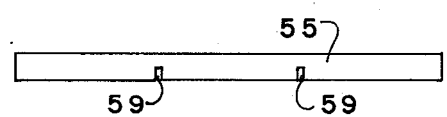
FIGURE 6
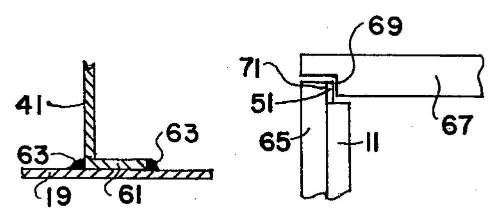
FIGURE 8
FIGURE 9
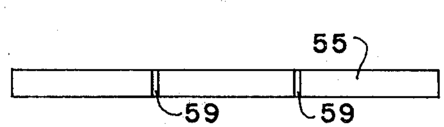
FIGURE 7
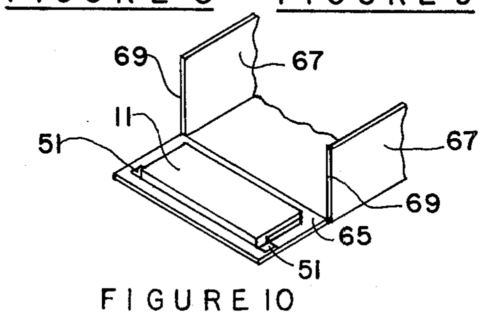
FIGURE 10

VEHICLE-ATTACHED ARTICLE CARRIER

This invention relates to article carriers. More particularly, this invention relates to article carriers that are attachable to land vehicles.

BACKGROUND OF THE INVENTION

Many types and sizes of tools and other articles are necessary in construction work or in any type of repair business. These tools and other articles must be readily available to the workman who is doing the constructing or repairing, and since he oftentimes does not know what problems he will face on a given day or what tools he will need, he needs to transport many tools and other items wherever he goes. Thus, the construction worker and the repairman need as much article carrier space in their vehicles as possible. Moreover, this article carrier space should be easily accessible to the workman so that he does not have to keep climbing onto and off of his vehicle to get tools and other articles. This lessens the chance of an on-the-job accident occurring due to unnecessary climbing in and out of the vehicle. It is also a requirement that the article carriers allow a minimum of movement by the articles when the articles are in the article carrier and when the vehicle is being driven so that the articles are not easily damaged.

A large number of such workers use land vehicles that have a tailgate-type closure at the rear of their vehicle (e.g., pickup truck) between two sidewalls. To date, the article carriers designed to be attached to these vehicles have been designed to attach to the sides of these vehicles. While serving the purpose of providing easily accessible storage space for tools and other articles, these side-attached article carriers tend to be cumbersome and also sometimes substantially increase the exterior dimensions of the vehicle. Furthermore, such article carriers do not possess the extra protection feature of always being closed when the tailgate is closed. Thus, frequently one may drive off without properly securing these sidewall-mounted article carriers shut, damaging the articles therein.

Thus, there exists a need in the art for an article carrier which can be attached to a land vehicle in a location that is easily accessible to a person without having the person climb onto the vehicle, which does not increase the size of the vehicle, and that is automatically and securely closed whenever the closure is shut.

This invention fulfills this need and many other needs apparent to the skilled person in the relevant art once given the following disclosure:

SUMMARY OF THE INVENTION

This invention provides an article carrier (e.g., tool box) which can be attached to the inside of the closure (e.g., tailgate) of a vehicle. The article carrier is comprised of two major elements, the body and the lid, which define a completely enclosed interior compartment. The bottom surface of the body is attached to the closure by bolts. The lid is rotatably attached to the body by a piano hinge. The lid has located at its two uppermost corners (when the article carrier is attached to the closure and the closure is in the closed position) flanges that extend outward from the lid, and that fit between the closure and the sidewalls of the vehicle. When the article carrier is properly attached to the closure, and when the closure is shut, the flanges will be locked in place between the closure and the sidewalls of the vehicle. Thus, the article carrier will be closed as long as the closure remains in the closed position. The article carrier can only be opened by opening the closure of the vehicle so that the flanges are freed from between the tailgate and the sidewalls.

The invention disclosed and claimed herein has many advantages over the vehicle-attached article carriers now in use.

One advantage of this invention is that it provides an article carrier that can be easily attached to a closure of a land vehicle.

Another advantage of this invention is that it provides an article carrier on a land vehicle which is easily accessible to a person standing on the ground so that the person does not have to climb onto the vehicle to gain access.

A further advantage of this invention is that it provides an article carrier which can only be opened if the closure to which it is attached is in the open position.

Yet another advantage of this invention is that it provides an article carrier with removable dividers such that the compartment sizes within the article carrier can be easily varied.

It is also an advantage of this invention that the article carrier is automatically closed whenever the closure is closed. Thus, the driver will not begin driving before the article carrier is closed, preventing the damaging of the articles that may bounce out of an unsecured article carrier.

Generally speaking this invention provides an article carrier which is attachable to a closure of a land vehicle, said article carrier having a base member and a lid which define an enclosed compartment, said lid having a flange attached thereto, said flange designed such that said flange is received between said closure and a sidewall of said land vehicle when said base member is attached to said closure and said closure is in the closed position.

Certain embodiments will now be described by reference to the accompanying drawings wherein:

IN THE DRAWINGS

FIG. 1 is a perspective view of one embodiment of this invention.

FIG. 2 is a sectionalized side view of the embodiment of this invention illustrated in FIG. 1, showing the article carrier lid in the closed position.

FIG. 3 is a plan view of the embodiment illustrated in FIG. 1, also showing the article carrier lid in the closed position.

FIG. 4 is a plan view, partially sectionalized, showing a compartment insert which can be placed in the article carrier and the abutting members thereto of the article carrier.

FIG. 5 is a sectionalized side view of the compartment insert illustrated in FIG. 4.

FIG. 6 is a plan view of the end pieces of the compartment insert illustrated in FIG. 4.

FIG. 7 is a side view of the end pieces illustrated in FIG. 6.

FIG. 8 is a sectionalized side view illustrating the shape of the permanent dividers and the attachment of the permanent dividers to the body of the article carriers.

FIG. 9 is a plan view of a portion of the tailgate (having an article carrier according to this invention attached thereto) and sidewall of a pickup truck showing how the flange of the article carrier is received between the tailgate and sidewalls of a vehicle.

FIG. 10 is a perspective view of a portion of a vehicle having an article carrier according to this invention attached thereto.

DETAILED DESCRIPTION OF THE DRAWINGS

Referring to the accompanying drawings, an article carrier which is attachable to the closure of a vehicle, and possesses other unique characteristics as described below, is illustrated. In the embodiment illustrated in the Figures, the article carrier is tool box 11.

Tool box 11 is comprised of two main elements, base member 13 and lid 15, which define a completely enclosed compartment when lid 15 is closed. Lid 15 is rotatably attached to base member 13 by piano hinge 33.

Base member 13 is comprised of bottom surface 19, rear surface 25, front surface 21, side panels 17, back overhang panel 39, back lip 27, and front lip 23. As shown in FIGS. 1 and 2, these elements are flat and sheet-like in shape such that base member 13 can be formed from a unitary sheet of metal or by welding the individual panels together. Bottom surface 19 would normally be of a width and length less than the width and length of the tailgate 65 to which the tool box 11 is to be attached.

Base member 13 is attached to the inside of tailgate 65 by bolts, the bolts running thru bolt holes 43 in bottom surface 19. In this embodiment, there is a bolt hole 43 in each corner of tool box 11. Base member 13 is bolted to the tailgate such that front surface 21 is near the top edge of tailgate 65, and is approximately parallel to the top edge of tailgate 65. Thus, rear surface 25 is located parallel to, and near (see FIG. 10) the bottom edge of tailgate 65 when base member 13 is properly attached to the tailgate.

Lid 15 is comprised of flange 31, panel 29, flange 37, and lip 35. Piano hinge 33 is connected to back overhang panel 39 of body 13 near the middle thereof, and to the edge of flange 31 of lid 15 to give the tool box 11 more strength and stability. The shape of lid 15 and base member 13 is such that the inner surface of flange 31 interfaces in part the exterior surface of back overhang panel 39 and flange 37 rests on front lip 23 when tool box 11 is in the closed position. Lip 35 is designed to overhang front lip 23 so that when tool box 11 is attached to tailgate 65 and tailgate 65 is in the closed position (with the tool box being vertical), lip 35 prevents rain from dripping down into tool box 11.

Members 49 are attached to the two uppermost corners of lid 15 as shown in FIGS. 1 and 4. Members 49 have flanges 51 which extend from the sides of tool box 11 as shown in the Figures. When tool box 11 is attached to tailgate 65 of a pickup as described above, and when tailgate 65 is closed, the longitudinal plane of the flanges 51 will be in a vertical plane and flanges 51 will be trapped between tailgate 65 and sidewalls 67 of the pickup truck. Thus, tool box 11 cannot be opened when tailgate 65 is closed. Tool box 11 can only be opened when tailgate 65 is open. The above is illustrated in detail in FIG. 9. Sidewall 67 has end wall 69 located at the end thereof. Tailgate 65 has side end portion 71 that, when closed, abuts sidewall 67. When tool box 11 is attached to tailgate 65 and when tailgate 65 is closed, flange 51 is trapped between end portion 71 and end wall 69.

Dividers 41 are located within tool box 11 to compartmentalize tool box 11. In this embodiment, dividers 41 are L-shaped and are welded to bottom surface 19 by welds 63 as shown in FIG. 8. Dividers 41 are L-shaped to provide greater resistance to forces perpendicular to the top flanges of dividers 41.

An optional feature of this invention illustrated in this embodiment is lock 53. Lock 53 is embedded in flange 37 and can be constructed to engage base member 13 when it is desired to lock lid 15 shut. Locks of this type are well known in the art and thus not illustrated in detail.

Another optional feature of this embodiment illustrated in the Figures is that temporary dividers can be inserted to further compartmentalize the inside of tool box 11. To insert temporary dividers 57, one must first place end blocks 55 against front panel 21 and back panel 25 as shown in FIG. 4. End blocks 55 have slots 59 therein as shown in FIGS. 6 and 7. The quantity of slots and the distance therebetween can be varied, depending on the number and sizes of compartments desired. Temporary dividers 57 are then placed in slots 59. End blocks 55 can also be placed between dividers 41 and sidewalls 17 if it is desired to further compartmentalize the ends of tool box 11.

Tool box 11 can be of a shape such that rear surface 25 rests on the truck bed when the tailgate is closed.

Once given the above disclosure, other features, modifications, and improvements will become apparent to one skilled in the art. Such features, modifications, and improvements are, therefore, considered to be within the scope of this invention.

I claim:

1. An article carrier adapted to be mounted on a closure of a vehicle of the type that has a sidewall, said sidewall and said closure defining part of said vehicle, said closure being movable between open and closed positions, said closure also having an inner wall which has an end portion that abuts said sidewall when the closure is in the closed position, said article carrier comprising:
   - article carrier means comprising (a) a base member which is arranged for attachment to the inner wall of said closure, and (b) a lid which may be opened to gain access to said article carrier means,
   - said lid having a flange which extends therefrom to a position between a portion of said sidewall and the closure when said base member is attached to said closure and said closure is in the closed position, whereby to securely hold said lid in its closed position.

2. An article carrier as defined in claim 1 in which said sidewall has a rear end, and said flange extends to a position adjacent to and rearwardly of said rear end when said base member is attached to said closure and said closure is in the closed position.

3. An article carrier as defined in claim 1 in which said flange is clamped between said sidewall and said closure when said base member is attached to said closure and said closure is in the closed position.

4. An article carrier as defined in claim 1 in which said sidewall has a rear end, and said flange extends to a position adjacent to and rearwardly of said rear end and is clamped between said sidewall and said closure when said base member is attached to said closure and said closure is in the closed position.

5. An article carrier as defined in claim 1 wherein said base member has holes therein complementary to holes in said closure so that bolts can be passed through said holes to attach said base member to said closure.

6. An article carrier as defined in claim 1 wherein said flange extends from the uppermost corner of said lid when said article carrier is attached to said closure and said closure is in the closed position.

7. An article carrier according to claim 1 further comprising at least one divider which is attached to said base member inside said article carrier and spaced from the ends of said body.

8. An article carrier according to claim 7 wherein said base member is comprised of a bottom panel, a front wall, a back wall, and two sidewalls, and wherein said divider runs between front wall and said back wall and is spaced from said sidewalls.

9. An article carrier according to claim 8 wherein said base member further comprises a back overhang panel which extends forwardly from said backwall, and wherein said lid is attached to said back overhang panel by a hinge, said lid having a surface that interfaces with a portion of said back overhang panel when said lid is closed.

10. An article carrier according to claim 9 wherein said lid has a first lip which overhangs a portion of the front wall of said base member when said article carrier is closed, whereby rain water is diverted away from said front wall by said first lip.

11. An article carrier according to claim 10 wherein said base member has a second lip which extends outwardly from said front panel and which abuts said first lip when said lid is closed.

12. An article carrier according to claim 11 further comprising temporary dividers which can be placed within said article carrier, said temporary dividers being held in place by end members which fit inside said article carrier and have slots therein to receive said temporary dividers.

13. An article carrier according to claim 1 wherein said closure is a tailgate.

* * * * *